2 Sheets—Sheet 1.
M. P. EWING, dec'd.
Assignor by mesne Assignments to Vacuum Oil Company.
MATERIAL FOR LUBRICATING.
No. 7,322. Reissued Sept. 26, 1876.
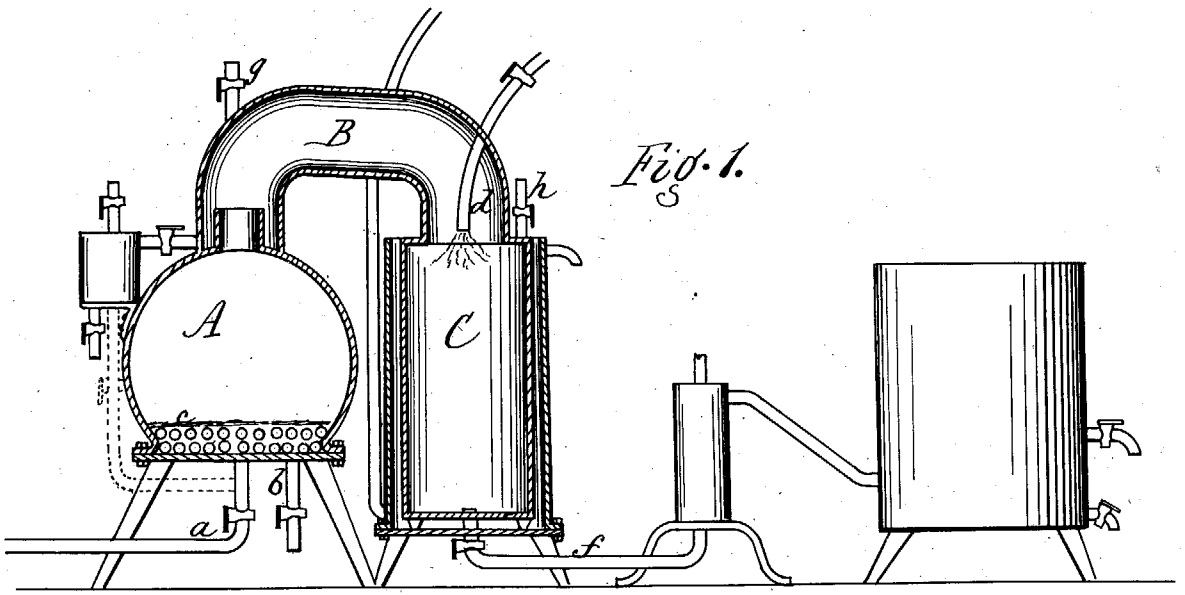
Witnesses.
E. B. Scott
Louis D. Sahm.
Inventor.
The Vacuum Oil Company,
per R. H. Osgood,
Atty.

2 Sheets—Sheet 2.
M. P. EWING, dec'd.
Assignor by mesne Assignments to Vacuum Oil Company.
MATERIAL FOR LUBRICATING.
No. 7,322. Reissued Sept. 26, 1876.
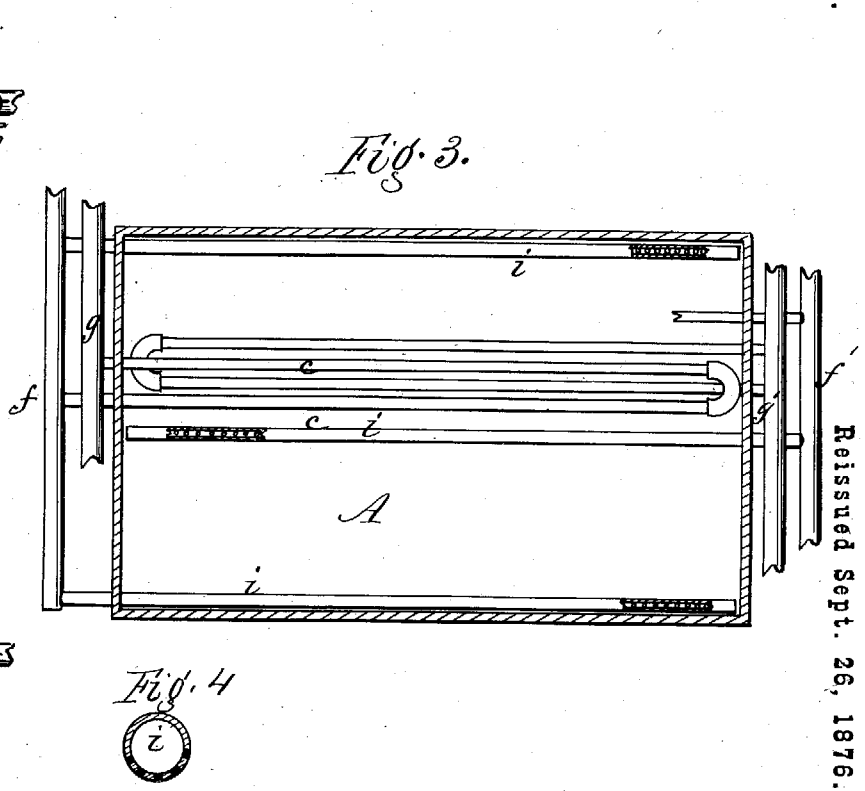
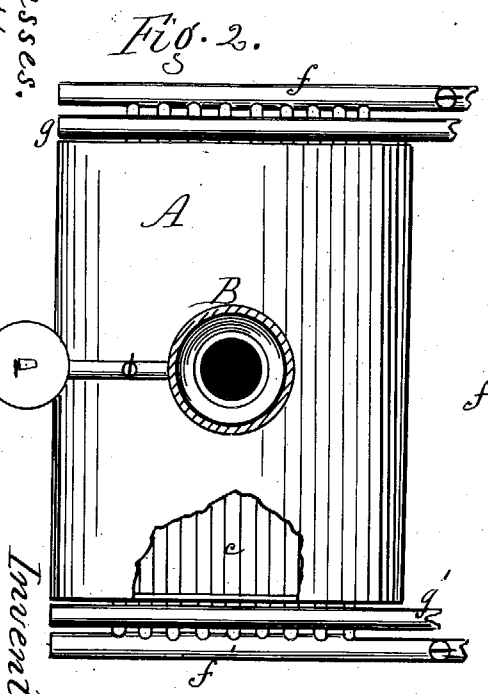
Witnesses.
E. B. Scott.
Louis Pfahn.
Inventor.
The Vacuum Oil Company,
by R. L. Osgood,
Atty.

UNITED STATES PATENT OFFICE.

VACUUM OIL COMPANY, OF ROCHESTER, NEW YORK, ASSIGNEE, BY MESNE ASSIGNMENTS, OF M. P. EWING, DECEASED.

IMPROVEMENT IN MATERIAL FOR LUBRICATING.

Specification forming part of Letters Patent No. 58,020, dated September 11, 1866; reissue No. 7,322, dated September 26, 1876; application filed January 29, 1876.

DIVISION B.

*To all whom it may concern:*

Be it known that M. P. EWING, late of Rochester, Monroe county, State of New York, now deceased, invented a new and useful Process for Producing Residual Heavy Hydrocarbon-Oils, and the following is a full and exact description thereof:

The term "heavy hydrocarbon oils" is well understood by the trade as signifying hydrocarbon-oils from which the naphthas and the illuminating-oils have been removed. The gravity (Baumé) of the heavy hydrocarbon-oil is, therefore, lower than that of illuminating-oil, never, it is believed, exceeding 35°, and ranging from that down to 24°; whereas illuminating-oil ranges from 50° to 40°.

The oil thus known as heavy hydrocarbon-oil has, in greater or less degree, certain oleaginous qualities which render it very useful for many purposes. It is obtained both as a distillate of crude petroleum or of bituminous coal, and as a residuum or reduction of crude petroleum. When obtained as a distillate it is accompanied by certain light oils of an offensive odor, generally attributed to decomposition produced at the high temperature required for vaporizing the heavy oil, the vapors of such decomposition going over with the proper vapors of the heavy oil, and all being condensed together. When obtained as a residuum or reduction of crude petroleum, the practice, up to the time of the said EWING'S invention, was to remove the naphthas and illuminating-oils by distillation under atmospheric pressure by the use of direct fire applied to the still. The high degree of heat required under these conditions for effecting the removal of the illuminating-oils made the interior surface of the vessel in which the distillation was conducted so hot that the residual or reduced oil remaining therein was, where it came in contact with such surfaces, burned or scorched, thereby producing a tarry substance having the character of lamp-black, which substance, being diffused in the oil, was offensive and troublesome. And the same high temperature developed in the residuum volatile oils, or "light ends," which, by reason of their offensive odor, and their reduction of the fire-test which the residual oil would stand, were objectionable in the use of the residual oil.

By the use of vacuum distillation, particularly with the aid of steam, the vapors of the illuminating-oil are raised and carried over at a temperature within the distilling-vessel very much lower than that required for the same effect when working under atmospheric pressure, so much lower that the vessel is not heated so hot as to scorch or burn the residual or reduced oil in the manner before mentioned, and the volatile oils or light ends are not to any injurious extent formed.

The present division of reissue relates specially to the process of producing the residual product described and claimed in another division of reissue of said EWING'S patent of September 11, 1866, No. 58,020, which division is of the same date as this. In conducting the process, an apparatus is employed in which a continuous feed and steam heat are used, and the accompanying drawings illustrate an apparatus adapted to the purpose.

A is a retort, into which the crude oil is continuously fed by a pipe, *a*. The residuum produced by the distillation is discharged by a pipe, *b*. These pipes have suitable cocks for admitting and discharging the oils. In the bottom of the retort are situated coils of steam-pipe *c*. A neck or tube, B, connects the retort with a condenser, C, into which the oil vapor is carried, and this vapor is condensed by a jet of water entering from pipe *d*. From the condenser the distilled oil and water are drawn by a pipe, *f*, connecting with a suitable pump, which also serves to exhaust the air from the apparatus; or, if desired, the air may be exhausted by a Torricellian tube, or by admitting steam, or by any other desired method. Air is admitted to the retort or condenser at any time by means of cocks *g h*.

The steam-pipes *c c* are preferably connected at the sides of the retort or still with induction-pipes *f f'* and eduction-pipes *g g'*. One end of each coil connects with the induction-pipe on one side, and the other end with the eduction-pipe on the other side, by which means an active flow of the steam is produced, and it is not deadened or condensed as is the case where it passes through long continuous coils before escaping. One or more pipes, *i*, are passed inward from the induction-pipes *f f'*, and have minute perforations opening, preferably, from their under sides, Fig. 4, to allow the escape of live steam into the body of the oil. By the employment of the continuous feed-pipe *a* the oil may be kept at nearly the same level in the retort, thereby preventing any tendency to burn on the sides. In order to produce the distillation as rapidly as possible, the oil is, preferably, kept standing in a thin body above the steam-pipes.

By means of the perforated pipe or pipes *i* steam, preferably superheated, may be injected into the body of oil, thereby rapidly carrying off the volatile portions and reducing the residuum to the desired consistency without burning.

This process of removing naphthas and the illuminating-oils from the petroleum by distillation under vacuum with steam, for the purpose of producing the unburned heavy oil as a residuum or reduction, was not known or practiced up to the time of the said EWING'S invention. By this improved process a residual heavy hydrocarbon-oil is produced from which the lighter oils have been evaporated, and which is practically free from burned or scorched particles of the kind before described, and from volatile oils or light ends.

What is claimed herein as new, the invention of the said M. P. EWING, is—

The process of making residual heavy hydrocarbon-oil without burning, by distillation of the light oils from crude petroleum under vacuum with steam, substantially as described.

In witness whereof we have hereunto set our names in the presence of the subscribing witnesses this 24th day of January, 1876.

VACUUM OIL COMPANY,
Per JOHN D. HELMER, *President.*
H. B. EVEREST,
*Secretary and Treasurer.*

Witnesses:
G. A. DAVIS,
C. M. EVEREST,
R. F. OSGOOD,
E. B. SCOTT.